(12) United States Patent
Xing et al.

(10) Patent No.: US 10,955,737 B2
(45) Date of Patent: Mar. 23, 2021

(54) PHOTOGRAPHING SYSTEM FOR VIEWING 3D IMAGES WITH NAKED EYES AND USING METHOD THEREOF

(71) Applicant: Tianyi Xing, Tianjin (CN)

(72) Inventors: Tianyi Xing, Tianjin (CN); Yu Xing, Tianjin (CN)

(73) Assignee: TIANJIN CRDT FLUID CONTROL SYSTEM LTD., Tianjin (CN)

( * ) Notice: Subject to any disclaimer, the term of this patent is extended or adjusted under 35 U.S.C. 154(b) by 0 days.

(21) Appl. No.: 16/485,459

(22) PCT Filed: Feb. 13, 2018

(86) PCT No.: PCT/CN2018/076649
§ 371 (c)(1),
(2) Date: Aug. 13, 2019

(87) PCT Pub. No.: WO2018/149393
PCT Pub. Date: Aug. 23, 2018

(65) Prior Publication Data
US 2020/0004131 A1 Jan. 2, 2020

(30) Foreign Application Priority Data

Feb. 15, 2017 (CN) .......................... 201710079692.7
Feb. 15, 2017 (CN) .......................... 201710082499.9
Feb. 28, 2017 (CN) .......................... 201710116306.7

(51) Int. Cl.
*G03B 35/08* (2021.01)
*G02B 30/26* (2020.01)
(Continued)

(52) U.S. Cl.
CPC ............ *G03B 35/08* (2013.01); *G01B 11/005* (2013.01); *G02B 30/26* (2020.01); *G03B 17/12* (2013.01); *G03B 17/425* (2013.01); *G06T 7/521* (2017.01); *G06T 7/55* (2017.01); *G06T 7/70* (2017.01); *H04N 5/2253* (2013.01); *H04N 5/2254* (2013.01); *H04N 5/247* (2013.01)

(58) Field of Classification Search
USPC ........................................................ 396/411
See application file for complete search history.

(56) References Cited

U.S. PATENT DOCUMENTS

2019/0361334 A1* 11/2019 Xing ..................... G06T 7/55

\* cited by examiner

*Primary Examiner* — Rodney E Fuller
(74) *Attorney, Agent, or Firm* — Greg G. Wang; Bei & Ocean

(57) ABSTRACT

An image photographing system for viewing 3D images with naked eyes and using method thereof, including an L-shaped frame (1), wherein, a top end of a vertical portion of the L-shaped frame successively at equal intervals providing with: an intermediate photographing mechanism, a left photographing mechanism and a right photographing mechanism, a left driving mechanism and a right driving mechanism, a guide post, a vertical driving servo motor, a driving lead screw; a support plate drives the left driving mechanism and the right driving mechanism to move up and down by moving up and down along the guide post under the drive of the driving lead screw, so as to drive the left photographing mechanism or the right photographing mechanism to swing up and down. The present invention can see the realistic and natural 3D images with naked eyes.

6 Claims, 4 Drawing Sheets

(51) Int. Cl.
*G06T 7/55* (2017.01)
*G06T 7/521* (2017.01)
*G06T 7/70* (2017.01)
*G01B 11/00* (2006.01)
*H04N 5/247* (2006.01)
*G03B 17/12* (2021.01)
*G03B 17/42* (2021.01)
*H04N 5/225* (2006.01)

PHOTOGRAPHING SYSTEM FOR VIEWING 3D IMAGES WITH NAKED EYES AND USING METHOD THEREOF

TECHNICAL FIELD OF THE INVENTION

The present invention relates to an image photographing method for dynamic images, and in particular to an image photographing system for viewing clear and stereoscopic dynamic three-dimensional (hereinafter referred to as 3D) images with naked eyes and using method thereof.

BACKGROUND OF THE INVENTION

People would like to photograph a real 3D scene they see in daily life in a 3D method and then play the scene to everyone in a 3D method. FIG. 1 shows the existing method of realizing the above technique.

As the most widely used prior art at present, as shown in FIG. 1, two cameras, i.e., a left camera 301 and a right camera 302, are arranged in parallel at a distance of 63 mm (that is the distance between human eyes), and are biased inward at a preset small angles of $\alpha$ and $\alpha'$, respectively (at this moment $\alpha=\alpha'$). Before photographing, an X-direction polarized lens or a red lens is mounted on the lens of the left camera 301, and a Y-direction polarized lens or a green lens is mounted on the lens of the right camera 302; and, the two cameras are simultaneously started for photographing. During displaying, the two images are simultaneously displayed on the screen. Since the distance h between the intersection "O" of the center lines of the lenses of the two cameras and the connection line between the left camera 301 and the right camera 302 is a constant, the intersection "O" cannot be positioned on the surface of the object all the time. Thus, if the video is watched by naked eyes, it is very blurry and there are ghost images, a pair of special glasses is required to wear when watching the video. If the images are photographed by the polarized light, it is necessary to wear a pair of polarized glasses. Since an X-direction polarized lens is worn on the left eye, only the images photographed by the left camera 301 can be seen, but the images photographed by the right camera 302 cannot be seen; and, since a Y-direction polarized lens is worn on the right eye, only the images photographed by the right camera 302 can be seen, but the images photographed by the left camera 301 cannot be seen. If the images are photographed by red and green lights, it is necessary to wear a pair of red-green glasses. Since a green lens is worn on the left eye, only the red images photographed by the left camera 301 can be seen, but the green images photographed by the right camera 302 cannot be seen; and, since a red lens is worn on the right eye, only the green images photographed by the right camera 302 can be seen, but the red images photographed by the left camera 301 cannot be seen. When a viewer faces the screen, the images viewed in this way are really like stereoscopic images simultaneously viewed by two eyes. This is the 3D movie we watched.

However, the above-mentioned prior art has the following defects:

when a real person is staring at an object, it must be accompanied by two actions at the same time, that are:

the first action is to adjust the curvature and thickness of the convex lens of the vitreous in the eyeball according to the distance between the viewer and the object being watched, so that the distance between the eye and the object to be viewed is exactly equal to the focal length, thus making the image of the object being viewed on the retina very clear.

The adjustment of the first action has been developed very well in the fully automatic focusing function of the camera and video camera. Some camera can even make a partial image in a picture very clear, and other image located in front of or behind the partial image is blurred, which means that the camera can adjust the focal length to exactly the same distance as the object and the viewer. However, the image on the photo is still very different from what the real person sees is because of lack of stereo. No matter how advanced the camera or video camera was used when photographing, the single image was always photographed by the single lens. Therefore, although viewers used their both eyes to view the image simultaneously, they still feel the same as viewing the image with only one eye, lacking of sense of stereo. The second action is to stare an intersection "O" of the object to be viewed by two eyes of a viewer simultaneously. Since the different positions of two eyes have different angles of view projected to the intersection "O", two images seen at the same time by two eyes are different. However, the two images are coincident with high precision at the intersection "O" when staring simultaneously by two eyes. Therefore, the objects seen by real person have a stereoscopic effect and do not find ghost images. This is our ideal 3D image. In the process of photographing 3D videos, in the prior art, since the object being photographed is moving, this moving object cannot be placed on the point "0" at the intersection of the center lines of the two cameras all the time. When the two images photographed by the two cameras are played simultaneously, ghost images appear. This explains why the scenes we see in our daily life are not ghost images, but when playing 3D images are ghosting. Therefore, people requires a 3D glasses when watching 3D movies so that only the images photographed by the left camera can be seen by the left eye, and only the images photographed by the right camera can be seen by the right eye. In this way, the viewers brain reflects 3D images instead of ghost images.

FIG. 1 shows a block diagram of a 3D camera in the prior art. When photographing 3D videos, center lines of the two cameras and the connection line between the two cameras have preset angles $\alpha$, $\alpha'$, that is to say, the left camera 301 and the right camera 302 have a fixed relative positions. Only the object is placed at the intersection "O" between the center lines of the left and right cameras 301, 302, the clear and ghost-free images can be obtained. The distance between the intersection "O" and the connection line between the two cameras is h, and any position except for the intersection "O" will generate ghost images during playing.

Obviously, in the prior art, the viewer can see clear and stereoscopic images if a pair of 3D glasses is worn, but the positions of the two images are different in any plane except for the position of h. That is to say, in the prior art, although they are in the same position on the object, the two image points are actually two spatial coordinates. This effect cannot be compared with the high precision coincidence effect of staring at two different images of the moving object in the real scene, which is not completely conform to ergonomics or bionics. Therefore, it makes the viewer has uncomfortable feelings such as dizziness and nausea after a long time watching. Besides, when watching the video photographed by this method on a TV or a mobile phone, the viewer has to wear a pair of special glasses, and the viewer has to remove the glasses when seeing somewhere else, and then wear it on when watching. The repeated work brings inconvenience to the viewer, thus the above-mentioned photographing method cannot be used for daily life.

Nowadays, almost all of existing live TV shows, TV shows and movie shows are taken by a single camera, viewing from the watching, we still watching with "one eye".

SUMMARY OF THE INVENTION

The object of the present invention is to provide an image photographing system for viewing 3D images having stereoscopic dynamic images with naked eyes and using method thereof.

The present invention employs the following technical solutions.

An image photographing system for viewing 3D images with naked eyes, including an L-shaped frame; at a top end of a vertical portion of the L-shaped frame, there are successively at equal intervals provided with: an intermediate photographing mechanism used for emitting a laser beam to the object to be photographed to generate a diffuse reflection spot and photographing the object, and a left photographing mechanism and a right photographing mechanism separately used for locating the object through the diffuse reflection spot generated on the object by the laser beam projected by the intermediate photographing mechanism and photographing the object; a support plate is provided above a horizontal portion of the L-shaped frame; a left driving mechanism and a right driving mechanism used for driving the left photographing mechanism and the right photographing mechanism to swing left and right are provided at positions, corresponding to the left photographing mechanism and the right photographing mechanism, on an upper end face of the support plate, respectively; a guide post and a vertical driving servo motor are vertically arranged on a horizontal portion of the L-shaped frame; a driving shaft of the vertical driving servo motor is connected to a driving lead screw, and the driving lead screw is connected to the support plate through a screw hole in a penetrated manner; the guide post penetrates through the support plate; and, the support plate drives the left driving mechanism and the right driving mechanism to move up and down by moving up and down along the guide post under the drive of the driving lead screw, so as to drive the left photographing mechanism or the right photographing mechanism to swing up and down.

The intermediate photographing mechanism includes an intermediate bracket which is fixed at the top end of the vertical portion of the L-shaped frame and used for placing an intermediate camera, and a fixed rod which has an upper end corresponding to the intermediate camera and is hinged with the bracket through a first universal hinge; a lower end of the fixed rod is connected to a manual rotating rod; an intermediate laser pointer is provided at a front end of the manual rotating rod; and, the camera is located on the same vertical line as the intermediate laser pointer.

The left photographing mechanism and the right photographing mechanism are of same structure, and each includes: a second universal hinge which is provided above the top end of the vertical portion of the L-shaped frame, and a guide shaft which is horizontally hinged onto the second universal hinge; side camera and side laser pointer are provided at an end of the guide shaft through a fixed plate, respectively, and are arranged on the fixed plate and located on a same vertical line, and each of the side cameras is located above the side laser pointer; and, the other end of the guide shaft is connected to a left driving mechanism or a right driving mechanism for driving the guide shaft to drive the fixed plate, the side cameras and the side laser pointers to swing left and right or up and down.

The left driving mechanism or the right driving mechanism is the same in structure and each includes: a nut fixed on the support plate, a bushing which is fixed at an upper end of the nut and used for being inserted into the guide shaft in the left photographing mechanism or the right photographing mechanism in a penetrated manner, and a horizontal driving servo motor fixed on the support plate; a rotating shaft of the horizontal driving servo motor is connected to a horizontal driving lead screw; the horizontal driving lead screw is in threaded connection to the nut; and, the nut drives the bushing to swing left and right under the drive of the horizontal driving lead screw, so as to drive the guide shaft in the left photographing mechanism or the right photographing mechanism to swing left and right.

A method of using the image photographing system for viewing 3D images with naked eyes, including: switching on the intermediate laser pointer and the side laser pointers, respectively, to obtain an intermediate spot and two side spots; wherein the intermediate spot is positioned on the object, the intermediate camera capturing the intermediate spot and two side spots and transmitting the captured signals to a control mechanism; the control mechanism operating the vertical driving servo motor and the horizontal driving servo motors to drive the spots from the side laser pointers to coincide with the spot projected from the intermediate laser pointer; the control mechanism controlling the side cameras to photograph the object simultaneously.

When the object is in a moving state, the operator operates the manual rotating rod so as to keep the spot projected by the intermediate laser pointer positioning on the object continuously, and the intermediate camera keeps capturing the moving spot and transmitting the captured signal to the control mechanism in real time. The control mechanism real-time operates the vertical driving servo motor and the horizontal driving servo motor to drive the spots from the side laser pointers to coincide with the spot projected from the intermediate laser pointer, and controls the side cameras to photograph the object simultaneously.

A method of using the image photographing system for viewing 3D images with naked eyes, including: switching on the side laser pointers respectively, and switching off the intermediate laser pointer, capturing, by the intermediate camera, the spotted light worn on the object and the spots projected by the side laser pointers and then transmitting the captured signals to the control mechanism; the control mechanism operating the vertical driving servo motor and the horizontal driving servo motor to drive the spots from the side laser pointers to coincide with the spotted light source worn on the object; and the control mechanism controlling the side cameras to photograph the object simultaneously.

When the object wearing the spotted light source is in a moving state, the intermediate camera keeps capturing the moving spotted light source and transmitting the captured signal to the control mechanism in real time. The control mechanism real-time operates the vertical driving servo motor and the horizontal driving servo motor to drive the spots from the side laser pointers to coincide with the spotted light source worn on the object, and controls the side cameras to photograph the object simultaneously.

A method of using the image photographing system for viewing 3D images with naked eyes, including: switching on the side laser pointers respectively, and switching off the intermediate laser pointer; generating a spot projected by the laser pointer held by an operator on the object and capturing it by the intermediate camera, and capturing the spots projected by the side laser pointers, and then transmitting the captured signals to the control mechanism; the control mechanism operating the vertical driving servo motor and the horizontal driving servo motor to drive the spots from the side laser pointers to coincide with the spot projected by the laser pointer held by the operator; and the control mechanism controlling the side cameras to photograph the object simultaneously.

When the object is in a moving state, the operator keeps projecting on the object to generate a spot by the laser pointer, the intermediate camera keeps capturing the moving spot and transmitting the captured signal to the control mechanism in real time. The control mechanism real-time operates the vertical driving servo motor and the horizontal driving servo motor to drive the spots from the side laser pointers to coincide with the spot projected by the laser pointer held by the operator, and controls the side cameras to photograph the object simultaneously.

The image photographing system for viewing 3D images with naked eyes and the using method of the present invention is based on the bionics of human visual vision and fully utilizes ergonomics, thus having highly realistic images. It is not necessary to wear glasses when watching the 3D video taken by the method of the present invention, and the images seen with the naked eyes are realistic, natural, full of stereo sense, and will not feel uncomfortable when watching for a long time. The present invention provides us a real world with a realistic visual experience, that is to say, though the images for playing are virtual, the viewer's visual experience is real, stereoscopic and clear.

BRIEF DESCRIPTION OF THE DRAWINGS

FIG. 8 is a schematic diagram of the photographing method according to the embodiment 3 of the present invention;
in which:

| | |
|---|---|
| 1: L-shaped frame | 1a: vertical portion |
| 1b: horizontal portion | 2: left photographing mechanism |
| 3: intermediate photographing mechanism | |
| 4: right photographing mechanism | |
| 5: guide post | 6: support plate |
| 7: driving lead screw | 8: vertical driving servo motor |
| 9: left driving mechanism | 10: right driving mechanism |
| 31: intermediate camera | 32: bracket |
| 33: first universal hinge | 34: fixed rod |
| 61: screw hole | 35: manual rotating rod |
| 36: intermediate laser pointer | 101: bracket |
| 102: second universal hinge | 103: guide shaft |
| 104: side camera | 105: fixed plate |
| 106: side laser pointer | 201: nut |
| 202: bushing | 203: horizontal driving servo motor |
| 204: horizontal driving lead screw | 300: frame |
| 301: left camera | 302: right camera |

α: angle between the photographing directions of the left photographing mechanism and the connection line between the left and right photographing mechanisms in the prior art;
α': angle between the photographing direction of the right photographing mechanism and the connection line between the left and right photographing mechanisms in the prior art;
"○": intersection between the photographing directions of the left and right photographing mechanisms in the prior art;
h: distance between the intersection "○" and the L-shaped frame in the prior art;
θ: angle between the photographing directions of the left photographing mechanism and the connection line between the left and right photographing mechanisms;
θ': angle between the photographing direction of the right photographing mechanism and the connection line between the left and right photographing mechanisms;
P: intersections between the photographing directions of the left and right photographing mechanisms in the embodiments 1, 3; and also the diffuse reflection spot generated by the intermediate laser pointer or the operator's hand-held laser pointer on the surface of the object;
Q: intersection between the photographing directions of the left and right photographing mechanisms in the embodiment 2; and also the spotted light source wore on the object to be photographed;
H: distance between the intersection P or Q between the photographing directions of the left and right photographing mechanisms and the L-shaped frame 300;
46: laser pointer held by the operator in the embodiment 3.

DETAILED DESCRIPTION OF THE INVENTION

The method of using the image photographing system for viewing 3D images with naked eyes and the using method thereof of the present invention will be described below in detail by embodiments with reference to the accompanying drawings.

Figure 1:
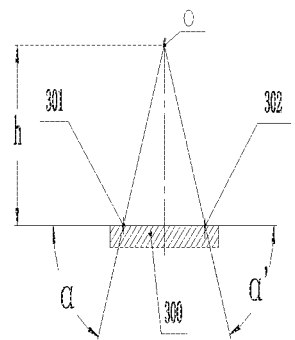
FIG. 1 is a block diagram of a 3D camera in the prior art.
Figure 2:
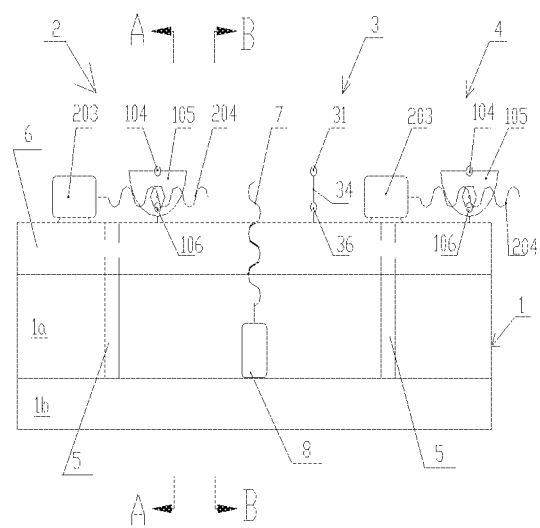
FIG. 2 is a schematic diagram of the overall layout of the photographing system according to the present invention.
Figure 3:
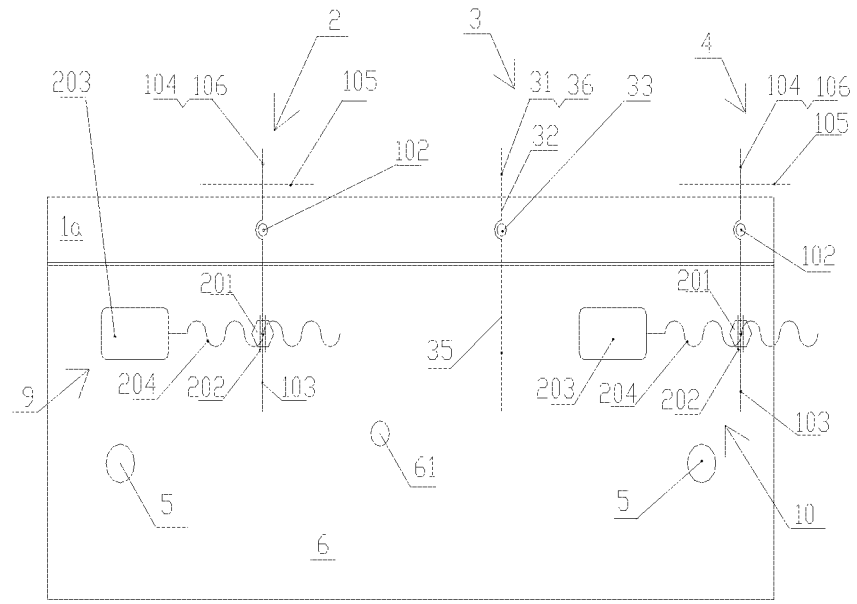
FIG. 3 is a top view of FIG. 2.

As shown in FIGS. 2, 3, an image photographing system for viewing 3D images with naked eyes, including an L-shaped frame 1; at a top end of a vertical portion 1a of the L-shaped frame, there are successively at equal intervals provided with: an intermediate photographing mechanism 3 used for emitting a laser beam to the object to be photographed to generate a diffuse reflection spot and photographing the object, and a left photographing mechanism 2 and a right photographing mechanism 4 separately used for locating the object through the diffuse reflection spot generated on the object by the laser beam projected by the intermediate photographing mechanism and photographing the object, making the spots projected by the left and right photographing mechanisms coinciding with the diffuse reflection spot; a support plate 6 is provided above a horizontal portion 1b of the L-shaped frame 1; a left driving mechanism 9 and a right driving mechanism 10 used for driving the left photographing mechanism 2 and the right photographing mechanism 4 to swing left and right are provided at positions, corresponding to the left photographing mechanism 2 and the right photographing mechanism 4, on an upper end face of the support plate 6, respectively; a guide post 5 and a vertical driving servo motor 8 are vertically arranged on the horizontal portion 1b of the L-shaped frame 1; a driving shaft of the vertical driving servo motor 8 is connected to a driving lead screw 7, and the driving lead screw 7 is connected to the support plate 6 through a screw hole 61 in a penetrated manner; the guide post 5 penetrates through the support plate 6; and the support plate 6 drives the left driving mechanism 9 and the right driving mechanism 10 to move up and down by moving up and down along the guide post 5 under the drive of the driving lead screw, the left driving mechanism 9 and the right driving mechanism 10 move up and down so as to drive the guide shaft 103 of the left photographing mechanism 2 or the right photographing mechanism 4 to swing up and down.

Figure 5:
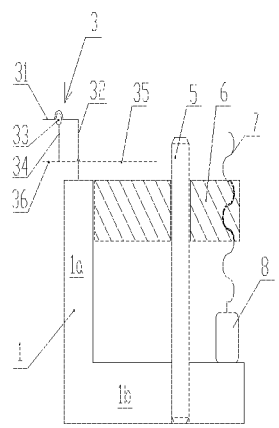
FIG. 5 is a sectional view of FIG. 2 taken along line B-B.

As shown in FIGS. 2,3,5, the intermediate photographing mechanism 3 includes an intermediate bracket 32 which is fixed at the top end of the vertical portion 1a of the L-shaped frame 1 and used for placing an intermediate camera 31, and a fixed rod 34 which has an upper end corresponding to the intermediate camera 31 and is hinged with the bracket through a first universal hinge 33; a lower end of the fixed rod 34 is connected to a manual rotating rod 35; an intermediate laser pointer 36 is provided at a front end of the manual rotating rod 35; and, the camera 31 is located on the same vertical line as the intermediate laser pointer 36.

Figure 4:
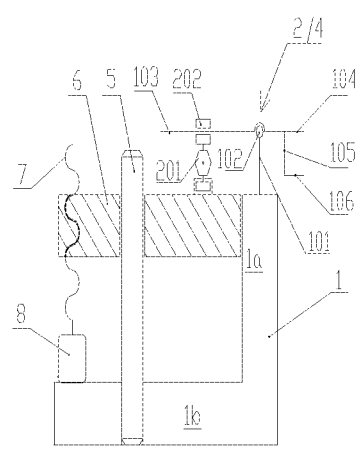
FIG. 4 is a sectional view of FIG. 2 taken along line A-A.

As shown in FIGS. 2, 4, the left photographing mechanism 2 and the right photographing mechanism 4 are of same structure, and each includes: a second universal hinge 102 which is provided above the top end of the vertical portion 1a of the L-shaped frame 1, and a guide shaft 103 which is horizontally hinged onto the second universal hinge 102; side camera 104 and side laser pointer 106 are provided at an end of the guide shaft 103 through a fixed plate 105, respectively, and are arranged on the fixed plate 105 and located on a same vertical line; and each of the side cameras 104 is located above the side laser pointers 106; and, the other end of the guide shaft 103 is connected to the left driving mechanism 9 or the right driving mechanism 10 for driving the guide shaft 103 to drive the fixed plate 105, the side cameras 104 and the side laser pointers 106 to swing left and right or up and down.

As shown in FIGS. 2, 4, the left driving mechanism 9 and the right driving mechanism 10 are of same structure, each includes: a nut 201 fixed on the support plate 6, a bushing 202 which is fixed at an upper end of the nut 201 and used for being inserted into the guide shaft 103 in the left photographing mechanism 2 or the right photographing mechanism 4 in a penetrated manner, and a horizontal driving servo motor 203 fixed on the support plate 6; a rotating shaft of the horizontal driving servo motor 203 is connected to a horizontal driving lead screw 204; the horizontal driving lead screw 204 is in threaded connection to the nut 201; and, the nut 201 drives the bushing 202 to swing left and right under the drive of the horizontal driving lead screw 204, so as to drive the guide shaft 103 in the left photographing mechanism 2 or the right photographing mechanism 4 to swing left and right.

The overall control mechanism and the power supply mechanism in the present invention adopt the technical scheme of patent No. 201420592944.8, titled REMOTE CONTROL DEVICE OF A LASER-GUIDED TROLLEY.

The using method of the image photographing system for viewing 3D images with naked eyes has three using ways. The details are as follows.

First Using Method:

A method of using the image photographing system of the present invention, including: switching on the intermediate laser pointer and the side laser pointers, respectively, to obtain an intermediate spot and two side spots; wherein the intermediate spot is positioned on the object, the intermediate camera capturing the intermediate spot and two side spots and transmitting the captured signals to the control mechanism; the control mechanism operating the vertical driving servo motor and two horizontal driving servo motors to drive the spots from the side laser pointers to coincide with the spot projected from the intermediate laser pointer; the control mechanism controlling the side cameras to photograph the object simultaneously.

When the object is in a moving state, the operator operates the manual rotating rod 35 so as to keep the spot projected by the intermediate laser pointer positioning on the object continuously, and the intermediate camera keeps capturing the three moving spots and transmitting the captured signals to the control mechanism in real time. The control mechanism real-time operates the vertical driving servo motor and the two horizontal driving servo motors to drive the spots from the side laser pointers to coincide with the spot projected from the intermediate laser pointer, and controls the side cameras to photograph the object simultaneously.

Figure 6:
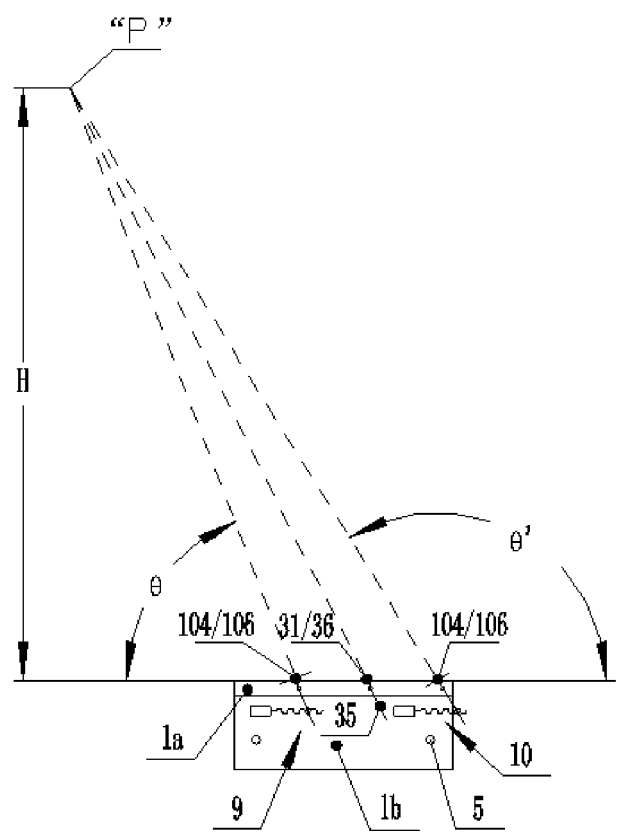
FIG. 6 is a schematic diagram of the photographing method according to the embodiment 1 of the present invention.

As shown in FIG. 6, the operator holds the L-shaped frame 1 of the camera of the present invention, and operates the manual rotating rod 35 to adjust the angle of the laser beam projected by the intermediate laser pointer 36, so that the laser beam projected by the intermediate laser pointer 31 projects on the intersection P on the object and forms a diffuse reflection spot and a distance H between the intersection P and the plane of the vertical portion 1a of the L-shaped frame 1. The center of the intersection P is the center of the diffuse reflection spot formed by the laser beam projected by the intermediate laser pointer 36 on the surface of the object. The laser beams projected by the two driven side laser pointers 106 project on the surface of the object, respectively, to form two driven diffuse reflection spots. The intermediate camera on the intermediate photographing mechanism transmits the position of three diffuse reflection spots to the control mechanism in real time. And the control mechanism operates the vertical driving servo motor 8 and the two horizontal driving servo motors 203 according to the positions of three diffuse reflection spots, the three servo motors are working immediately when receive the instruction from the control mechanism which decide the direction of rotation, number of rotation and rotation angles. The vertical driving servo motor 8 drives the driving lead screw 7 rotating to move the support plate 6 up and down, so that centers of two diffuse reflection spots on the object projected by laser beams projected by the two driven side laser pointers 106 are consistent with the height of the intersection P. Meanwhile, the control mechanism controls the relative actions of two horizontal driving servo motors 203, respectively, so as to capture the diffuse reflection spots projected by the two side laser pointers 106 immediately and move the spots to the position of the intersection P precisely, thus determining the value of distance H between the intersection P and the vertical portion 1a of the L-shaped frame. The intermediate camera 31 is fixed in the middle of the connection line of two side cameras 104, and $\theta$ and $\theta'$ are angles between the centerlines of the lens of two side cameras 104 and the plane of the vertical portion 1a of the L-shaped frame, respectively (as FIG. 6). The capture actions are done by the vertical driving servo motor 8 and the two horizontal driving servo motors 203, the three servo motors are working immediately when receive the instruction from the control mechanism which decide the direction of rotation, number of rotation and rotation angles. The vertical driving servo motor 8 rotates to drive the driving lead screw 7 to rotate so as to drive the support plate 6 to translational move up and down, and further to drive the left photographing mechanism 2 and the right photographing mechanism 4 to move up and down. In this way, two guide shafts 103 are swing up and down to drive two fixed plates 105 swing up and down so as to align the height of the three diffuse reflection spots. Meanwhile, two horizontal driving servo motors 203 drive two horizontal driving lead screws 204, respectively, to do the rotation action according to the rotation instruction sent by the control mechanism, so that two nuts move horizontally along the axes of two horizontal driving lead screws 204, respectively; and further two bushings 202 respectively drive the guide shafts 103 to swing left and right according to the respective angles so as to drive the fixed plates 105 to swing left and right according to the respective angles. In this way, the fixed plates 105 of the left and right photographing mechanisms not only can swing up and down according to the instruction of the control mechanism but also can swing left and right, so that an angle θ between the side laser pointer of the left photographing mechanism 2 and plane of the vertical portion 1a of the L-shaped frame 1 is formed, and an angle θ between the side laser pointer of the right photographing mechanism 4 and plane of the vertical portion 1a of the L-shaped frame 1 is formed (as shown in FIG. 6). In this way, two diffuse reflection spots on the object projected by two side laser pointers 106 immediately move to the center of the intersection P projected by the intermediate laser pointer precisely.

When the object is in a moving state, the distance from the diffuse reflection spots projected by two side laser pointers to the intersection P on the surface of the object, e.g. the distance H between the intersection P and the plane of the vertical portion 1a of the L-shaped frame 1, is changing continuously. The photographing system of the present invention is capable of capturing the diffuse reflection spot, adjusting the distance difference between the diffuse reflection spot and the distance H quickly, so that the diffuse reflection spot which is overlapped and formed by one diffuse reflection spot projected by an intermediate laser pointer 36 and two diffuse reflection spots projected by two side laser pointers 106 can precisely coincide with the intersection P.

It can be seen from the working process of the photographing system of the present invention that: during the entire photographing period, e.g. from the beginning to the end of the photographing, the swing angles θ and θ' of two side cameras and the distance H between the intersection P and the plane of the vertical portion 1a of the L-shaped frame 1, which are time functions, are always changing instantaneously over time, and time is a variable of the function, $H=f(t)$. When photographing a certain instantaneous distance H, the value H must be equal to the position of the screen when the video is played to this instant. The value of distance H and the time function are recorded by the computer when the video is taken, so the photographing system of the present invention reproduces the function $H=f(t)$ when playing the video, so that the distance H between two cameras and screen can be adjusted automatically when playing the video, and the screen is kept on the diffuse reflection spot thus obtaining clean and stereoscopic dynamic images on the screen continuously.

Figure 7:
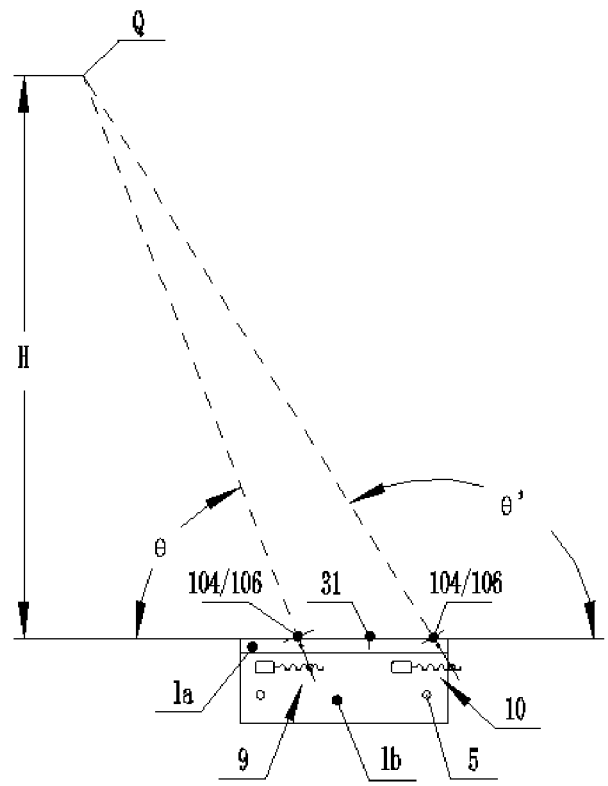
FIG. 7 is a schematic diagram of the photographing method according to the embodiment 2 of the present invention.

Second Using Method:

A method of using the image photographing system for viewing 3D images with naked eyes, including: switching on the side laser pointers respectively, and switching off the intermediate laser pointer 36, capturing, by the intermediate camera, the spotted light worn on the object and the spots projected by the side laser pointers and then transmitting the captured signals to the control mechanism; the control mechanism operating the vertical driving servo motor and the horizontal driving servo motor to drive the spots from the side laser pointers to coincide with the spotted light source Q worn on the object; and the control mechanism controlling the side cameras to photograph the object simultaneously, as shown in FIG. 7.

When the object wearing the spotted light source is in a moving state, the intermediate camera keeps capturing the moving spotted light source Q and transmitting the captured signal to the control mechanism in real time. The control mechanism real-time operates the vertical driving servo motor and the horizontal driving servo motor to drive the spots from the side laser pointers to coincide with the spotted light source worn on the object, and controls the side cameras to photograph the object simultaneously.

As shown in FIG. 7, a slight change to the second using method allows the photographing system to capture the object in another way: the intersection P in the first using method is replaced by a spotted light source Q wore on the object, and the spotted light source Q is equivalent to the intersection P projected by the intermediate laser pointer in the first using method. When the object is in a moving state, the L-shaped frame 1 of the present invention is placed in a fixed position, normal direction of the plane of the vertical portion 1a of the L-shaped frame 1 faces the object, the power of the intermediate laser pointer 36 is turned off, and the two spots projected by the side laser pointers 106 are used for capturing the center of the spotted light source Q; so that the distance H can be determined by precisely coinciding the two spots from the side laser pointers 106 with the spotted light source Q. The capturing action of the spot is that the center of the light source Q is found by the intermediate camera 31 for capturing the center of the diffuse reflection spot, and the angles θ and θ' between the connection line between the two side cameras 104 and the photographing direction of the two side cameras 104 are transmitted to the control mechanism. The control mechanism real-time operates the vertical driving servo motor 8 and two horizontal driving servo motors 203 to rotate immediately when receive the instruction from the control mechanism which decide the direction of rotation, number of rotation and rotation angles. The vertical driving servo motor 8 drives the driving lead screw 7 rotating to drive the support plate 6 to translational move up and down, and further to drive the left photographing mechanism 2 and the right photographing mechanism 4 to move up and down. In this way, two guide shafts 103 are swing up and down to drive two fixed plates 105 to swing up and down so that the two side laser pointers 106 and two side cameras are swing up and down simultaneously. Meanwhile, two horizontal driving servo motors 203 drive two horizontal driving lead screws 204, respectively, to do the rotation action according to the rotation instruction sent by the control mechanism, so that two nuts move horizontally along the axes of two horizontal driving lead screws 204, respectively; and further two bushings 202 respectively drive the guide shafts 103 to swing left and right according to the respective angles so as to drive the fixed plates 105 to swing left and right according to the respective angles. In this way, the fixed plates 105 of the left and right photographing mechanisms not only can swing up and down according to the instruction of the control mechanism but also can swing left and right, so that two diffuse reflection spots on the object projected by two side laser pointers 106 immediately move to the center of the spotted light source Q projected by the intermediate laser pointer precisely. When the object is in a moving state, the distance from the diffuse reflection spots projected by two side laser pointers to the spotted light source Q on the surface of the object, e.g. the distance H, is changing continuously. The photographing system of the present invention is capable of fast adjusting the angles θ and θ' to adjust the distance from the spots to the spotted light source Q. Therefore, the photographing system of the present invention is capable of capturing the spotted light source Q, so that two diffuse reflection spots on the object projected by two side laser pointers 106 immediately move to the spotted light source Q precisely.

In this way, automatic photographing can be achieved by the present invention, no matter how the spotted light source Q moves, where it moves, and how fast the moving, the photographing system of the present invention can automatically capture the spotted light source Q and can adjust the distance between the spotted light source Q and the plane of the vertical portion 1a of the L-shaped frame to the value of the distance H. The present invention ensures clean and stereoscopic dynamic images on the screen continuously.

The method of the present invention is very practical because of the automatic capturing capability of the spots, especially for sports shows such as photographing football matches. For example, for a football match, each of the football players wear a spotted light sources $Q_1$, $Q_2$, $Q_3$, Q . . . , $Q_{22}$, and the football wears a spotted light source $Q_0$, a remote switch is applied to control the switch on/off of the light sources. The operator switches on the corresponding light sources when photographing the players, and keeps the rest light sources in the switch off state, the light sources are switched on/off optionally. The video photographed by this method can achieve stereoscopic dynamic effects when playing.

Figure 8:
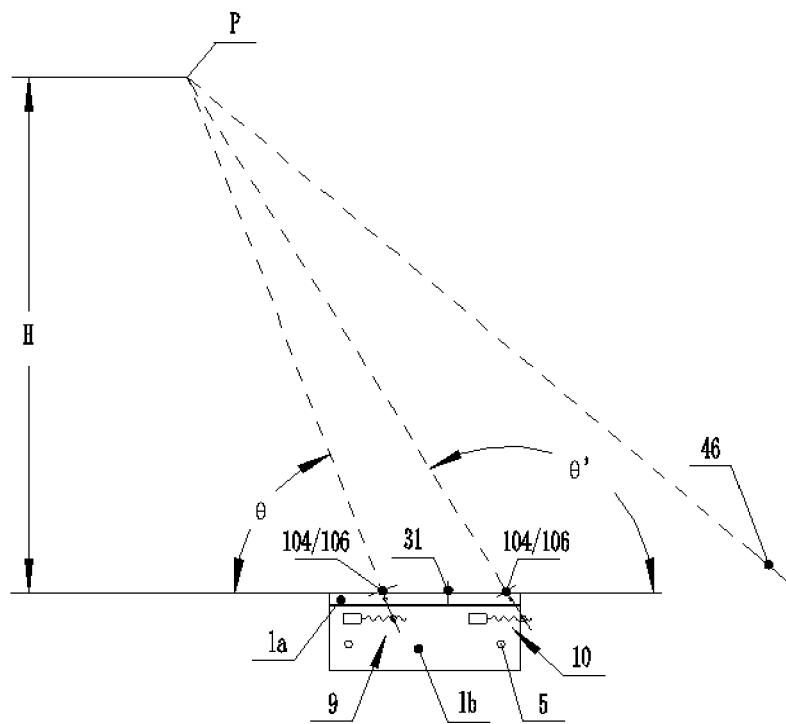

Third Using Method:

A method of using the image photographing system for viewing 3D images with naked eyes, including: switching on the side laser pointers respectively, and switching off the intermediate laser pointer 36; generating a spot P projected by another laser pointer 46 held by an operator on the object and capturing it by the intermediate camera (as shown in FIG. 8), and capturing the spots projected by the side laser pointers, and then transmitting the captured signals to the control mechanism; the control mechanism operating the vertical driving servo motor and the horizontal driving servo motor to drive the spots from the side laser pointers to coincide with the spot P projected by the laser pointer 46 held by the operator; and the control mechanism controls the side cameras to photograph the object simultaneously.

When the object is in a moving state, the operator keeps projecting on the object to generate a spot P by the laser pointer, the intermediate camera keeps capturing the moving spot and transmitting the captured signal to the control mechanism in real time. The control mechanism real-time operates the vertical driving servo motor and the horizontal driving servo motor to drive the spots from the side laser pointers to coincide with the spot P projected by the laser pointer 46 held by the operator, and controls the side cameras to photograph the object simultaneously.

As shown in FIG. 8, the intermediate laser pointer 36 is switched off firstly, and the L-shaped frame 1 of the present invention is placed in a fixed position, the operator is located at the position except of the position of the L-shaped frame and holds another laser pointer 46 instead of the middle laser pointer 36 in the first using method to project on the target being photographed, and the laser beam forms a diffused reflection spot P on the object. The photographing system of the present invention can capture the spot P, and make the two centers of the spots of the two laser beams projected by the two side laser pointers capturing the center of the spot P. The two spots projected by the side laser pointers 106 coincide with the spot P projected by the laser pointer 46 held by the operator so as to determine the distance H between the spot P and the plane of the vertical portion 1a of the L-shaped frame. The capturing action of the spot is that the center of the spot P is found by the intermediate camera 31 for capturing the center of the diffuse reflection spot, and the angles θ and θ' between the connection line between the two side cameras 104 and the photographing direction of the two side cameras 104 are transmitted to the control mechanism. The control mechanism real-time operates the vertical driving servo motor 8 and two horizontal driving servo motors 203 to rotate immediately when receive the instruction from the control mechanism which decide the direction of rotation, number of rotation and rotation angles. The vertical driving servo motor 8 drives the driving lead screw 7 rotating to drive the support plate 6 to translational move up and down, and further to drive the left photographing mechanism 2 and the right photographing mechanism 4 to move up and down. In this way, two guide shafts 103 are swing up and down to drive two fixed plates 105 to swing up and down so that the two side laser pointers 106 and two side cameras are swing up and down simultaneously. Meanwhile, two horizontal driving servo motors 203 drive two horizontal driving lead screws 204, respectively, to do the rotation action according to the rotation instruction sent by the control mechanism, so that two nuts move horizontally along the axes of two horizontal driving lead screws 204, respectively; and further two bushings 202 respectively drive the guide shafts 103 to swing left and right according to the respective angles so as to drive the fixed plates 105 to swing left and right according to the respective angles. In this way, the fixed plates 105 of the left and right photographing mechanisms not only can swing up and down according to the instruction of the control mechanism but also can swing left and right, so that two diffuse reflection spots on the object projected by two side laser pointers 106 immediately move to the center of the spot P precisely. When the object is in a moving state, the distance from the diffuse reflection spots projected by two side laser pointers to the spot P on the surface of the object, e.g. the distance H, is changing continuously. The photographing system of the present invention is capable of fast adjusting the angles θ and θ' to adjust the distance from the spots to the spot P.

It can be seen that when photographing by the present invention, angles θ and θ' between centerlines of the lens of two side cameras 104 and the plane of the vertical portion 1a of the L-shaped frame, the distance H between the intersection P and the plane of the vertical portion 1a of the L-shaped frame are continuously changing with the changing position of the moving object. The intersection P can be adjusted to position on the object continuously, when the images taken by the two side cameras 104 are simultaneously played on one screen, two high-precision overlapping images are obtained, and the obtained images are clean and stereoscopic dynamic.

The second using method combines with the third using method can achieve a more flexible photographing effect. For example, when photographing a football game by the second using method, the second using method can be switched off and the third using method is adopted, and the second using method can be restored and the third using method is switched off when required.

What is claimed is:

1. A method of viewing 3D images with naked eyes, using an image photographing system including an L-shaped frame (1), wherein, a top end of a vertical portion (1a) of the L-shaped frame (1) successively at equal intervals providing with: an intermediate photographing mechanism (3) configured for projecting a laser beam to the object to be photographed to generate a diffuse reflection spot and photographing the object; a left photographing mechanism (2) and a right photographing mechanism (4) respectively configured for locating the object through the diffuse reflection spot generated on the object by the laser beam projected by the intermediate photographing mechanism and photographing the object; a support plate (6) is provided above a horizontal portion (1b) of the L-shaped frame (1); a left driving mechanism (9) and a right driving mechanism (10) configured for driving the left photographing mechanism (2) and the right photographing mechanism (4) to swing left and right are provided at positions, corresponding to the left photographing mechanism and the right photographing mechanism, on an upper end face of the support plate (6), respectively; a guide post (5) and a vertical driving servo motor (8) are vertically arranged on the horizontal portion (1b) of the L-shaped frame (1); a driving shaft of the vertical driving servo motor (8) is connected to a driving lead screw (7), and the driving lead screw (7) is connected to the support plate (6) through a screw hole in a penetrated manner; wherein, the guide post (5) penetrates through the support plate (6); and, the support plate (6) drives the left driving mechanism (9) and the right driving mechanism (10) to move up and down by moving up and down along the guide post (5) under the drive of the driving lead screw (7), so as to drive the left photographing mechanism (2) or the right photographing mechanism (4) to swing up and down.

2. The method according to claim 1, wherein when the object is in a moving state, the operator operating the manual rotating rod so as to keep the spot projected by the intermediate laser pointer positioning on the object continuously; and the intermediate camera capturing the moving spot continuously and transmitting the captured signal to the control mechanism in real time; real-time operating, by the control mechanism, the vertical driving servo motor and the horizontal driving servo motor to drive the spots from the side laser pointers to coincide with the spot projected from the intermediate laser pointer; and controlling, by the control mechanism, the side cameras to photograph the object simultaneously.

3. The method according to claim 1, comprising switching on the side laser pointers respectively, and switching off the intermediate laser pointer (36); capturing, by the intermediate camera, the spotted light worn on the object and the spots projected by the side laser pointers and then transmitting the captured signals to the control mechanism; operating, by the control mechanism, the vertical driving servo motor and the horizontal driving servo motor to drive the spots from the side laser pointers to coincide with the spotted light source worn on the object; and controlling, by the control mechanism, the side cameras to photograph the object simultaneously.

4. The method according to claim 3, wherein when the object wearing the spotted light source is in a moving state, the intermediate camera capturing the moving spotted light source continuously and transmitting the captured signal to the control mechanism in real time; real-time operating, by the control mechanism, the vertical driving servo motor and the horizontal driving servo motor to drive the spots from the side laser pointers to coincide with the spotted light source worn on the object; and controlling, by the control mechanism, the side cameras to photograph the object simultaneously.

5. The method according to claim 1, comprising switching on the side laser pointers respectively, and switching off the intermediate laser pointer (36); generating a spot projected by the laser pointer held by an operator on the object and capturing it by the intermediate camera; and capturing the spots projected by the side laser pointers, and then transmitting the captured signals to the control mechanism; the control mechanism operating the vertical driving servo motor and the horizontal driving servo motor to drive the spots from the side laser pointers to coincide with the spot projected by the laser pointer held by the operator; and the control mechanism controlling the side cameras to photograph the object simultaneously.

6. The method according to claim 5, wherein when the object is in a moving state, the operator projecting on the object continuously to generate a spot by the laser pointer; the intermediate camera capturing the moving spot continuously and transmitting the captured signal to the control mechanism in real time; real-time operating, by the control mechanism, the vertical driving servo motor and the horizontal driving servo motor to drive the spots from the side laser pointers to coincide with the spot projected by the laser pointer held by the operator; and controlling, by the control mechanism, the side cameras to photograph the object simultaneously.

* * * * *